United States Patent [19]

Csányi et al.

[11] Patent Number: 4,870,318

[45] Date of Patent: Sep. 26, 1989

[54] PROJECTOR LAMP EMITTING COLOR LIGHT

[75] Inventors: István Csányi, Dunakeszi; János Csiszár, Budapest; Lászlá Fehér, Budapest; Zoltán Losonczi, Budapest; György Szabo, Budapest, all of Hungary

[73] Assignee: Tungsram Részvénytársaság, Budapest, Hungary

[21] Appl. No.: 166,124

[22] Filed: Mar. 9, 1988

[30] Foreign Application Priority Data

Mar. 11, 1987 [HU] Hungary .............................. 1058/87

[51] Int. Cl.$^4$ .......................... H01J 5/10; H01J 61/40; H01K 1/32
[52] U.S. Cl. .................................. 313/113; 313/112; 350/166
[58] Field of Search .................. 313/113, 114, 112; 350/166

[56] References Cited

U.S. PATENT DOCUMENTS

| | | | |
|---|---|---|---|
| 3,527,974 | 9/1970 | Cooper | 313/113 |
| 3,615,161 | 10/1971 | Bragg | 350/166 |
| 4,386,292 | 5/1983 | Rothwell et al. | 313/113 X |
| 4,792,716 | 12/1988 | Walsh | 313/113 |

Primary Examiner—Kenneth Wieder
Attorney, Agent, or Firm—Spencer & Frank

[57] ABSTRACT

The invention refers to a projector lamp, which comprises a light source (3), a mirror (1) arranged in a space relationship to the light source (3) for projecting the light emitted by the light source (3) in a predetermined direction, the mirror (1) having a surface determined by a carrier element made of glass or plastics, and a layer system covering the surface of the mirror (1) and including layers characterized by refractive indices alternately at least 2.0 and at most 1.7. The improvement lies in applying layer system including at least four layers (4, 5, 6, 7) prepared for reflecting respective color components of the light emitted by the light source (3). The proposed projector lamp is capable of emitting color light without applying filters.

20 Claims, 1 Drawing Sheet

PROJECTOR LAMP EMITTING COLOR LIGHT

BACKGROUND OF THE INVENTION

The invention refers to a projector lamp, which comprises a light source, a mirror arranged in a space relationship to the light source for projecting the light emitted by the light source in a predetermined direction, the mirror having a surface determined by a carrier element made of glass or plastics, and a layer system covering the surface of the mirror and including layers characterized by refractive indices alternately at least 2.0 and at most 1.7. The projector lamp according to the invention is capable of emitting colour light.

The light sources linked with projector surfaces for projecting white light are well known. Among others the US-A 4 169 238, the DE-A 31 25 267 and DE-A 31 23 670 show projector lamps to be applied in film projector equipments.

If the object is to project colour light and not white, it is known to apply mirrors for reflecting the full range white light and front glass elements, e.g. front lenses for selective reflection or absorption of predetermined light components. The mirrors can be equipped with a thin layer for cooling the light. The disadvantage of applying materials capable of absorbing a required light range, and especially the range of the blue and green light is the high loss of intensity of the light to be projected. The transmissivity of the dicroic front glasses is relatively high (about 80%) but the light sources realised on their basis are relatively expensive because of the necessity of applying a rare mirror and a front element.

The best solution would be to realise a projector system with a mirror for projecting the desired spectrum range onto the surface to be lighted whereby it would be possible to avoid the front filtering elements. As an advantageous solution the thin layers covering the mirror surface should be taken into consideration.

In the first step a difference can be found between the different carrier materials applied for realising the mirror having thin layers on the surface.

The metallic carrier elements generally reflect the ultraviolet, visible and near infrared components of the light, practically the full spectrum range emitted by the light sources.

The glasses—excepting the poor $SiO_2$ glasses transmitting the three ranges mentioned above—absorb the ultraviolet light and transmit the visible and near infrared components.

The carrier material to be applied in projecting light should show high transmittivity or absorption in the range of the visible light but very low reflectivity in this range. The different glasses and the majority of plastics are applicable, e.g. the policarbonates and the polimethyl-metacrilate. For preparing lamps having reflection surfaces often a vessel made by pressing from glass or plastics is applied and this basic material can be used as a carrier element.

The next step is to investigate, which kind of changes are required in the surface of the carrier element in order to realise a layer system for reflecting only a selected range of the full spectrum range of the visible light.

From physics it is known that an interference filter can be realised by evaporating or sputtering in vacuum alternately thin layers with low and high refractive indices on the surface of a carrier element.

On the basis of this principle light sources were realised comprising a thin layer system on the outer surface of the vessel, the thin layer exhibiting features of an interference filter. These light sources are capable of emitting colour light. Such arrangements have become known among others from the HU-A 179 695, DE-A 36 17 683 and GB-A 2 103 830.

The afore-mentioned specifications show projector lamps equipped with a front filter and there isn't any known solution whereby projection of colour light would be possible without applying any front filter.

SUMMARY OF THE INVENTION

The object of the invention is to provide a projector lamp avoiding the afore-shown drawbacks.

The invention is based on the recognition that a mirror surface, as a reflector vessel should be selected as a carrier to be covered by layers selected in a special way when taking into consideration the values of their refractive indices. In this way it is possible to realise a mirror as a reflecting element which is capable of reflecting a relatively narrow spcetrum range from the full range light emitted by the light source.

On the basis of the recognition a projector lamp was developed for projecting colour light and including a mirror and a light source. This new kind of projector lamps can be applied especially for decoration purposes, e.g. for reflecting colour light to objects arranged in shop windows.

The mirror of the proposed projector lamp is made of glass or plastics and as a carrier element is covered by a high number (at least five) of thin layers showing alternately high (at least 2.0) and low (at most 1.7) refractive indices. According to the invention this layer system is selected for reflecting colour light chosen from white light emitted by the light source.

The selection means determining the optical thickness of the layers wherein the optical thickness is defined by the product of the refractive index and the thickness of the layer (expressed for thin layers in nanometers). Because of the lack of dimension of the refractive index the optical thickness is expressed also in nanometers (nm).

A series of invesitgation showed the best results with the following five layer systems, each comprising at least five layers, wherein the enumeration of the layers begins from the surface of the carrier:

(A) the first and last layers each have optical thicknesses up to 115 nm, particulary 57.5 nm and refractive indices at least 2.0, the intermediate layers having optical thicknesses in the range 115± ±6 nm and the first of them has a refractive index at most 1.7; or (B) the first and last layers each have optical thicknesses up to 425 nm, particularly 212.5 nm and refractive indices at most 1.7, the intermediate layers having optical thicknesses in the range 425± ±9 nm and the first of them has a refractive index at least 2.0; or (C) the first and each further layer of odd serial number have optical thicknesses in the range 148±6 nm, refractive indices at least 2.0, and the second and each further layer of even serial number have optical thicknesses also in the range 148±6 nm, but with different refractive indices at most 1.7; or (D) the first and last layers each have optical thicknesses up to 200 nm, particularly 100 nm and refractive indices at least 2.0, the intermediate layers having optical thicknesses in the range 200± ±20 nm and the first of them has a refractive index at most 1.7; or (E) the first and last layers each have optical thicknesses up to 360 nm, particularly 180 nm and refractive indices at most 1.7, the intermediate layers having optical thicknesses in the range 360± ±36 nm and the first of them has a refractive index at least 2.0.

Depending on the colour of the light required the layer system can be selected as one of the afore-mentioned systems. Of course, there are other possibilities, too.

The system (A) ensures reflection of blue light, the system (B) the reflection of green light, the system (C) the reflection of yellow light, the system (D) the reflection of red light and the system (E) the reflection of purple or lilac light.

The layer system of the projector lamp of the invention include advantageously nine or eleven layers of selected optical thicknesses.

As a substance of high refractive index zinc-sulphide, and as a substance of low refractive index magnesium-fluoride are especially preferred.

The layer system given above in items (A), (B), (D), (E) comprise the first and last layers as glazing layers for improving the impression of colour saturation (arising in an observer). When preparing light source for meeting not high quality requirements these layers can be omitted. The system shown in item (C) ensures the impression of colour saturation without applying any glazing layers.

The tolerance values determined for the optical thicknesses are those giving the limitation applied to the optical thin layers if they have to project light of required colour. On preparing layers of optical thicknesses differing from those given above it is possible that the colour of the light projected is not that required.

The mirror prepared on a carrier with the layer system as proposed by the invention is advantageously united into a projector lamp with a light source selected as a low voltage incandescent lamp, wherein the shortest distance between the front surface closing the mirror and the focal point of the mirror divided by the shortest distance between the afore-defined front surface and the centre of gravity of the incandescent body of the light source gives a value between 0.85 and 1.15, preferably about 1.0.

BRIEF DESCRIPTION OF THE DRAWINGS

The invention will be further described in more detail by way of example with reference to a preferred embodiment illustrated in the drawings, wherein.

DESCRIPTION OF THE PREFERRED EMBODIMENTS

Figure 1:
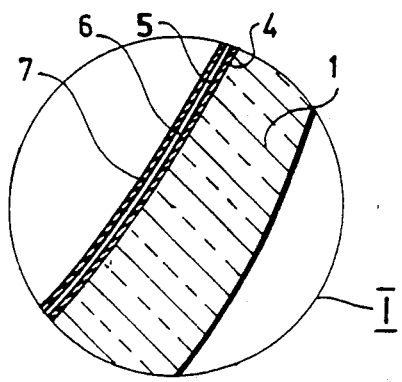
FIG. 1 is a fragmentary cross-section of a carrier element of a mirror prepared with the layer system of the invention.

The projector lamp of the invention (FIGS. 1 and 2) includes a mirror 1 having a recess for receiving a light source, for example an incandescent lamp 2 having an incandescent body 3. The reflecting surface of the mirror 1 determines a focal point 9 and a front surface 8 which can be closed by an appropriate translucent element made of glass or other material transmitting the light of required colour.

Figure 2:
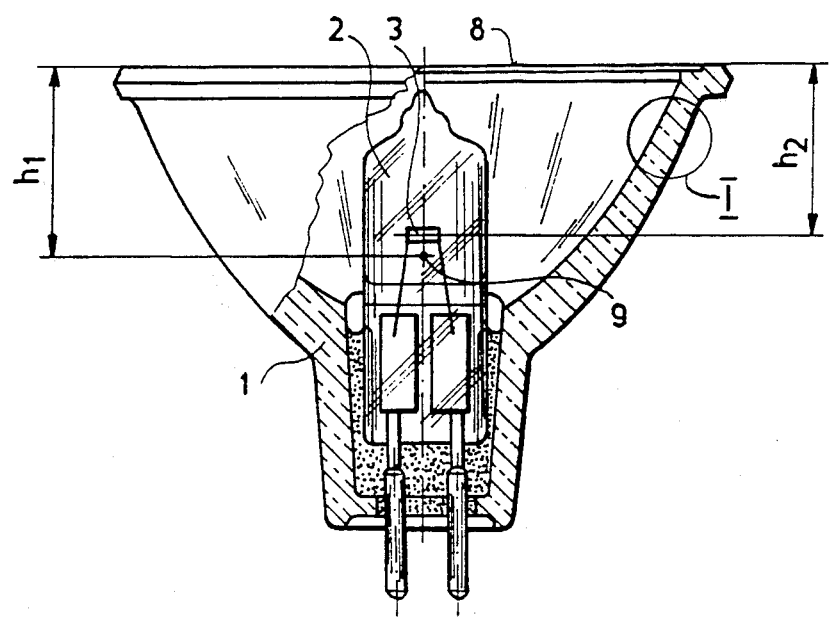
FIG. 2 is a partially sectional elevational view of a projector lamp incorporating the invention.

As shown in Fig. which is an enlarged illustration of the portion encircled at I in FIG. 2 the reflecting surface of the mirror 1 is covered by an appropriate layer system comprising at least five, preferably nine or eleven layers 4, 5, 6, 7.

The following non-limiting examples describe some preferred embodiments for projecting light of predetermined colour.

EXAMPLE 1

A halogen lamp should be equipped with a mirror of elliptic projecting surface for preparing a projector lamp capable of emitting yellow light.

The inner, reflecting surface of the mirror was covered by a layer system consisting of nine layers for projecting the selected colour.

The following Table 1 rcapitulates the main physical and chemical data of the layers comprised in the layer system. The layers are enumerated with serial numbers increasing as counted from the surface of the mirror 1. In the brackets the enumeration of the layers of the layer system according to FIG. 1 is given.

TABLE 1

| Serial number | Material | Refractive index, n | Thickness, d, nm | Optical thickness, n × d, nm |
|---|---|---|---|---|
| 1. (4) | zinc-sulphide, ZnS | 2.35 | 63 | 148 |
| 2. (5) | magnesium-fluoride, MgF$_2$ | 1.38 | 105 | 148 |
| 3. (6) | zinc-sulphide, ZnS | 2.35 | 63 | 148 |
| 4. (7) | magnesium-fluoride, MgF$_2$ | 1.38 | 105 | 148 |
| 5. | zinc-sulphide, ZnS | 2.35 | 63 | 148 |
| 6. | magnesium-fluoride, MgF$_2$ | 1.38 | 105 | 148 |
| 7. | zinc-sulphide, ZnS | 2.35 | 63 | 148 |
| 8. | magnesium-fluoride, MgF$_2$ | 1.38 | 105 | 148 |
| 9. | zinc-sulphide, ZnS | 2.35 | 63 | 148 |

The mirror 1 having projecting surface covered by the layers given above was united with the incandescent lamp 2 filled with a halogen.

The projector lamp of the invention was mounted in the way that the shortest distance $h_1$ between the front surface 8 of the mirror 1 and the focal point 9 of the mirror 1 be equal to the shortest distance $h_2$ (FIG. 2) between the front surface 8 and the centre of gravity of the incandescent body 3 being the light source of the projector lamp.

The projector lamp prepared with the nine layer reflecting system given above projects saturated yellow light.

EXAMPLE 2

A projector lamp was prepared with elements as listed in Example 1. The layer system was, however, different and showed the features recapitulated in the following Table 2.

TABLE 2

| Serial number | Material | Refractive index, n | Thickness, d, nm | Optical thickness, n × d, nm |
|---|---|---|---|---|
| 1. (4) | magnesium-fluoride, MgF$_2$ | 1.38 | 154 | 212.5 |

TABLE 2-continued

| Serial number | Material | Refractive index, n | Thickness, d, nm | Optical thickness, n × d, nm |
|---|---|---|---|---|
| 2. (5) | zinc-sulphide, ZnS | 2.35 | 181 | 425 |
| 3. (6) | magnesium-fluoride, MgF$_2$ | 1.38 | 308 | 425 |
| 4. (7) | zinc-sulphide, ZnS | 2.35 | 181 | 425 |
| 5. | magnesium-fluoride, MgF$_2$ | 1.38 | 308 | 425 |
| 6. | zinc-sulphide, ZnS | 2.35 | 181 | 425 |
| 7. | magnesium-fluoride, MgF$_2$ | 1.38 | 308 | 425 |
| 8. | zinc-sulphide, ZnS | 2.35 | 181 | 425 |
| 9. | magnesium-fluoride, MgF$_2$ | 1.38 | 308 | 425 |
| 10. | zinc-sulphide, ZnS | 2.35 | 181 | 425 |
| 11. | magnesium-fluoride, MgF$_2$ | 1.38 | 154 | 212.5 |

The projector lamp comprising the leleven part layer system shown above projects green light to the surface to be lighted.

EXAMPLE 3

A projector lamp was prepared with elements as listed in Example 1. The layer system was, however, different and was characterized by the features recapitulated in the following Table 3.

TABLE 3

| Serial number | Material | Refractive index, n | Thickness, d, nm | Optical thickness, n × d, nm |
|---|---|---|---|---|
| 1. (4) | zinc-sulphide, ZnS | 2.35 | 24 | 57.5 |
| 2. (5) | magnesium-fluoride, MgF$_2$ | 1.38 | 83 | 115 |
| 3. (6) | zinc-sulphide, ZnS | 2.35 | 48 | 115 |
| 4. (7) | magnesium-fluoride, MgF$_2$ | 1.38 | 83 | 115 |
| 5. | zinc-sulphide, ZnS | 2.35 | 48 | 115 |
| 6. | magnesium-fluoride, MgF$_2$ | 1.38 | 83 | 115 |
| 7. | zinc-sulphide, ZnS | 2.35 | 48 | 115 |
| 8. | magnesium-fluoride, MgF$_2$ | 1.38 | 83 | 115 |
| 9. | zinc-sulphide, ZnS | 2.35 | 48 | 115 |
| 10. | magnesium-fluoride, MgF$_2$ | 1.38 | 83 | 115 |
| 11. | zinc-sulphide, ZnS | 2.35 | 24 | 57.5 |

The projector lamp equipped with the layer system having layers exemplified above is capable of projecting saturated blue light.

EXAMPLE 4

A projector lamp was prepared with elements as listed in Example 1. The layer system was, however, different and was characterized by the features recapitulated in the following Table 4.

TABLE 4

| Serial number | Material | Refractive index, n | Thickness, d, nm | Optical thickness, n × d, nm |
|---|---|---|---|---|
| 1. (4) | magnesium-fluoride, MgF$_2$ | 1.38 | 72 | 100 |
| 2. (5) | zinc-sulphide, ZnS | 2.35 | 85 | 200 |
| 3. (6) | magnesium-fluoride, MgF$_2$ | 1.38 | 144 | 200 |
| 4. (7) | zinc-sulphide, ZnS | 2.35 | 85 | 200 |
| 5. | magnesium-fluoride, MgF$_2$ | 1.38 | 144 | 200 |
| 6. | zinc-sulphide, ZnS | 2.35 | 85 | 100 |
| 7. | magnesium-fluoride, MgF$_2$ | 1.38 | 144 | 200 |
| 8. | zinc-sulphide, ZnS | 2.35 | 85 | 200 |
| 9. | magnesium-fluoride, MgF$_2$ | 1.38 | 72 | 100 |

The projector lamp equipped with the layer system having layers exemplified above is capable of projecting saturated red light.

EXAMPLE 5

A projector lamp was prepared with elements as listed in Example 1. The layer system was, however, different and was chracterized by the features recapitulated in the following Table 5.

TABLE 5

| Serial number | Material | Refractive index, n | Thickness, d, nm | Optical thickness, n × d, nm |
|---|---|---|---|---|
| 1. (4) | magnesium-fluoride, MgF$_2$ | 1.38 | 130.4 | 180 |
| 2. (5) | zinc-sulphide, ZnS | 2.35 | 153 | 360 |
| 3. (6) | magnesium-fluoride, MgF$_2$ | 1.38 | 260.8 | 360 |
| 4. (7) | zinc-sulphide, ZnS | 2.35 | 153 | 360 |
| 5. | magnesium-fluoride, MgF$_2$ | 1.38 | 260.8 | 360 |
| 6. | zinc-sulphide, ZnS | 2.35 | 153 | 360 |
| 7. | magnesium-fluoride, MgF$_2$ | 1.38 | 260.8 | 360 |
| 8. | zinc-sulphide, ZnS | 2.35 | 153 | 360 |
| 9. | magnesium-fluoride, MgF$_2$ | 1.38 | 260.8 | 360 |
| 10. | zinc-sulphide, ZnS | 2.35 | 153 | 360 |
| 11. | magnesium-fluoride, MgF$_2$ | 1.38 | 130.4 | 180 |

The projector lamp equipped with the layer system having layers exemplified above is capable of projecting saturated purple or lilac light.

The greatest advantage of the projector lamp proposed according to the invention is the possibility of projecting near 100% of the energy content of the spectrum range selected from the light emitted by the light source, i.e. the light of required colour is projected by a high efficiency optical system to the surface to be lighted. This efficiency can be compared with the efficiency of at most 80% exhibiting by the best projector lamp of known construction bsed on front filters.

What we claim is:

1. In a projector lamp including a light source, a mirror arranged in a spaced relationship to said light source for projecting light, emitted by the light source, in a predetermined direction; said mirror including a light-transmitting carrier having a surface and a layer system supported on the surface and formed of a plurality of superposed layers; the improvement wherein the number of said layers is at least five; further wherein said layers, when viewed consecutively, have refractive indices alternating between at least 2.0 and at most 1.7; and further wherein the layer system includes means for causing the layer system to reflect, from an incident light spectrum, a wavelength band of a selected color light other than white light.

2. A projector lamp as set forth in claim 1, wherein said means comprises a selected optical thickness of each layer.

3. The projector lamp as set forth in claim 1, further comprising a front surface closing said mirror and an incandescent lamp having an incandescent body forming said light source; said incandescent body having a center of gravity and said mirror having a focal point; further wherein the shortest distance between said front surface and said focal point is in the range from 0.85 $h_2$ to 1.15 $h_2$, wherein $h_2$ is the shortest distance between said front surface and said center of gravity.

4. In a projector lamp including a light source, a mirror arranged in a spaced relationship to said light source for projecting light, emitted by the light source, in a predetermined direction; said mirror including a light-transmitting carrier having a surface and a layer system supported on the surface and formed of a plurality of superposed layers; the improvment wherein the number of said layers is at least five; further wherein said layers, when viewed consecutively, have refractive indices alternating between at least 2.0 and at most 1.7; and further wherein the layer system includes means for causing the layer system to reflect, from an incident light spectrum, a sufficiently narrow wavelength band of one selected color component of white light.

5. A projector lamp as set forth in claim 4, wherein said means comprises a selected optical thickness of each layer.

6. The projector lamp as set forth in claim 4, further comprising a front surface closing said mirror and an incandescent lamp having an incandescent body forming said light source; said incandescent body having a center of gravity and said mirror having a focal point; further wherein the shortest distance between said front surface and said focal point is in the range from 0.85 $h_2$ to 1.15 $h_2$, wherein $h_2$ is the shortest distance between said front surface and said center of gravity.

7. The projector lamp as set forth in claim 4, wherein the first layer and the last layer counted from said surface of said mirror have refractive indices of at least 2.0 and optical thicknesses up to 115 nm, the second layer being the first of the intermediate layers of said layer system having a refractive index of at most 1.7, and said intermediate layers have optical thicknesses in the range of 115±6 nm.

8. The projector lamp as set forth in claim 7, the optical thickness of said first and last layers being about 57.5 nm.

9. The projector lamp as set forth in claim 4, wherein the first layer and the last layer counted from said surface of said mirror have refractive indices of at most 1.7 and optical thicknesses up to 425 nm, the second layer being the first of the intermediate layers of said layer system having a refractive index of at least 2.0 and said intermediate layers have optical thicknesses in the range of 425±9 nm.

10. The projector lamp as set forth in claim 9, the optical thickness of said first and last layers being bout 212.5 nm.

11. The projector lamp as set forth in claim 4, wherein the first layer and the layers of odd serial numbers have refractive indices of at least 2.0, the second layer and further layers of even serial number in said layer system counted from the said surface of said mirror have refractive indices of at most 1.7, the optical thicknesses of said layers being in the range of 148±6 nm.

12. The projector lamp as set forth in claim 4, wherein the first layer and the last layer counted from said surface of said mirror have refractive indices of at most 1.7 and optical thicknesses up to 200 nm, the second layer being the first of the intermediate layers of said layer system having a refractive index of at least 2.0 and said intermediate layers have optical thicknesses in the range of 200±20 nm.

13. The projector lamp as set forth in claim 12, the optical thickness of said first and last layers being about 100 nm.

14. The projector lamp as set forth in claim 3, wherein the first layer and the last layer counted from said surface of said mirror have refractive indices of at most 1.7 and optical thicknesses up to 360 nm, the second layer being the first of the intermediate layers of said layer system having a refractive index of at least 2.0 and said intermediate layers have optical thicknesses in the range of 360±36 nm.

15. The projector lamp as set forth in claim 9, the optical thickness of said first and last layers being about 180 nm.

16. The projector lamp as set forth in claim 7, comprising eleven layers in said layer system covering said surface of said mirror, wherefrom the first layer and the last layer counted from said surface of said mirror are each zinc-sulphide layers with optical thicknesses in the range of 57±2 nm, from the intermediate layers of said layer system the first, third, fifth, seventh and ninth are magnesium-fluoride layers with optical thicknesses in the range of 115±3 nm, and the second, fourth, sixth and eighth are zinc-sulphide layers with optical thicknesses in the range of 115±3 nm.

17. The projector lamp as set forth in claim 9, comprising eleven layers in said layer system covering said surface of said mirror, wherefrom the first layer and the last layer counted from said surface of said mirror are each magnesium-fluoride layers having optical thicknesses in the range of 212±3 nm, from the intermediate layers of said layer system the first, third, fifth, seventh and ninth each are zinc-sulphide layers having optical thicknesses in the range of 425±4 nm, and the second, fourth, sixth and eighth are each magnesium-fluoride layers having optical thicknesses in the range of 425±4 nm.

18. The projector lamp as set forth in claim 11, comprising nine layers in said layer system covering said surfce of said mirror, wherefrom the first, third, fifth and ninth are each zinc-sulphide layers, and the second, fourth, sixth and eighth are each magnesium-fluoride layers.

19. The projector lamp as set forth in claim 12, comprising nine layers in said layer system covering said surface of said mirror, wherefrom the first layer and the last layer counted from said surface of said mirror are each magnesium-fluoride layers having optical thicknesses in the range of 100±10 nm, from the intermediate layers of said layer system the first, third, fifth and seventh are each zinc-fluoride layers having optical thicknesses in the range of 200±10 nm, and the second, fourth and sixth are each magnesium-fluroide layers having optical thicknesses in the range of 200±10 nm.

20. The projector lamp as set forth in claim 14, characterized in comprising eleven layers in said layer system covering said surface of said mirror, wherefrom the first layer and the last layer counted from said surface of said mirror are each magnesium-fluoride layers having optical thicknesses in the range 180±18 nm, from the intermediate layers of said layer system the first, third, fifth, seventh and ninth each are zinc-sulphide layers having optical thicknesses in the range 360±18 nm, and the second, fourth, sixth and eighth are each magnesium-fluoride layers having optical thicknesses in the range 360±18 nm.

* * * * *